Feb. 6, 1934.  R. H. CHILTON  1,945,595
SHACKLE
Filed Nov. 11, 1929  2 Sheets-Sheet 1

Inventor
Ralph H. Chilton
By Spencer Hardman & Fehr
His Attorneys

Feb. 6, 1934.  R. H. CHILTON  1,945,595

SHACKLE

Filed Nov. 11, 1929  2 Sheets-Sheet 2

Inventor
Ralph H. Chilton
By Spencer Hardman & Jehr
His Attorneys

Patented Feb. 6, 1934

1,945,595

UNITED STATES PATENT OFFICE 1,945,595

SHACKLE

Ralph H. Chilton, Dayton, Ohio, assignor to The Inland Manufacturing Company, Dayton, Ohio, a corporation of Delaware Application November 11, 1929
Serial No. 406,321

11 Claims. (Cl. 267—54)

This invention relates to coupling members or shackles, especially such as are used as spring shackles on vehicles.

In my copending application Serial Number 163,933, filed January 27, 1927, Patent Number 1,869,132, issued July 26, 1932, there is shown a related form of shackle having highly compressed resilient rubber bushings therein which provide for the pivotal movement by internal twist or distortion within the resilient material itself. In this prior application the shackle unit cannot be completely assembled prior to its assembly upon the parts connected thereby. An improved feature of the shackle of this present application is that it may be completely assembled with the resilient rubber parts thereof under the desired initial compression to provide an extension shackle unit which can be later easily attached in operative position to the parts connected thereby. This is an important advantage since the assembled shackle units may be manufactured at a distant plant and shipped to an automobile assembly plant and quickly attached in place to connect the chassis frame to the leaf springs without any further adjustment of the initial compression upon the resilient rubber bushings.

Another feature of this invention is the improved means for rigidly connecting such an assembled shackle unit to the end of a leaf spring.

Other features of this invention are the structural details which permit the shackle unit to be made largely or entirely from metal stampings and simple bolts or rivets whereby to greatly reduce cost of manufacture.

Further objects and advantages of the present invention will be apparent from the following description, reference being had to the accompanying drawings wherein a preferred embodiment of one form of the present invention is clearly shown.

Figure 4:
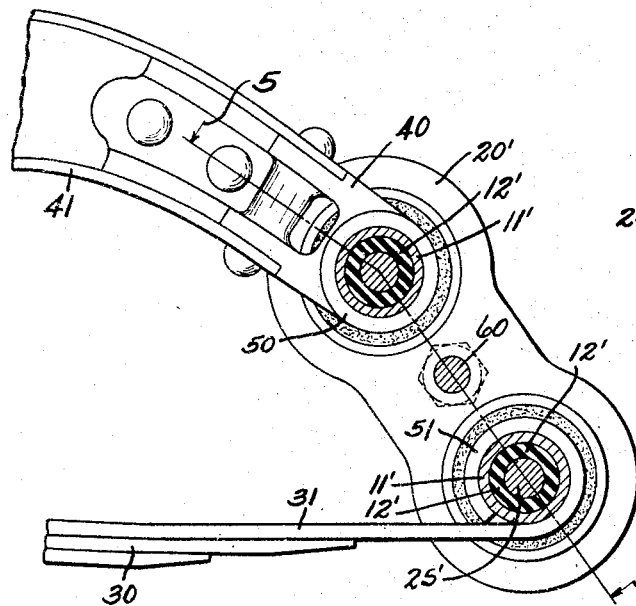
Figure 5:
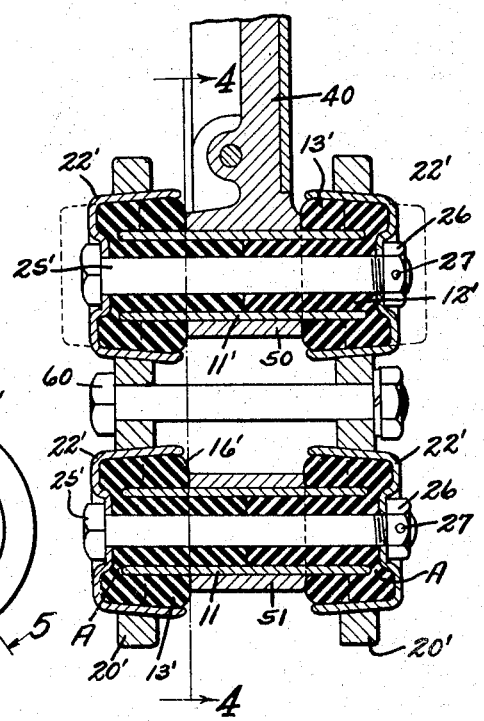

Figs. 4 and 5 show a modified form of extension shackle, Fig. 4 being taken on line 4—4 of Fig. 5, and Fig. 5 being taken on line 5—5 of Fig. 4.

Figure 6:
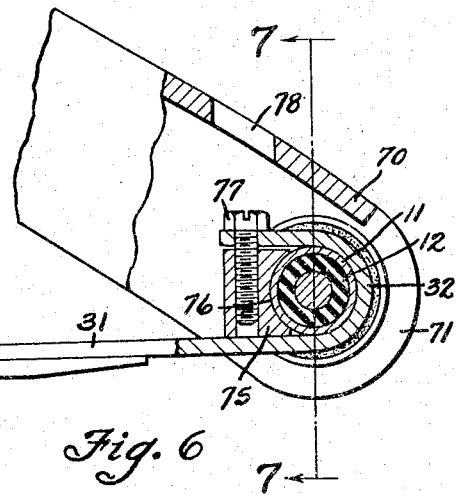

Fig. 6 shows a pivot shackle made according to this invention.

Figure 7:
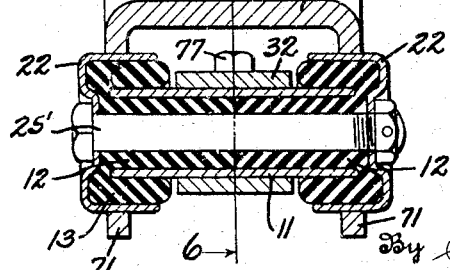

Fig. 7 is a section taken on line 7—7 of Fig. 6.

Figure 2:
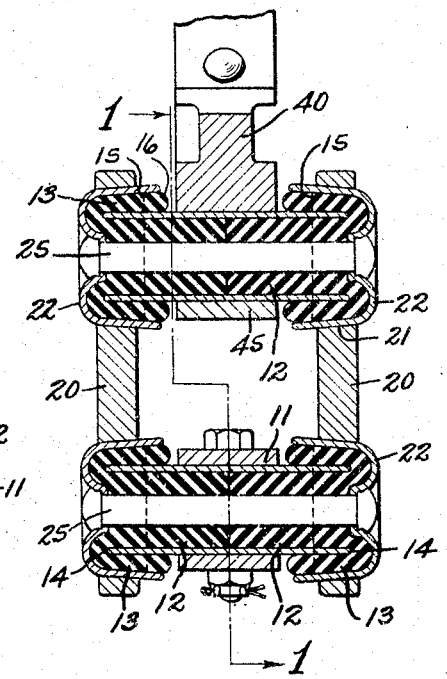
Fig. 2 is a section on the broken line 2—2 of Fig. 1.
Figure 8:
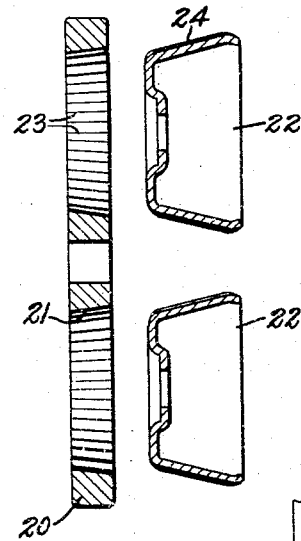

Fig. 8 is an exploded view showing the side link of the extension shackle of Figs. 2 and 5 and the separate pressed metal cups which are fixed within apertures in the side link.

Similar reference characters refer to similar parts throughout the several views.

Figure 3:
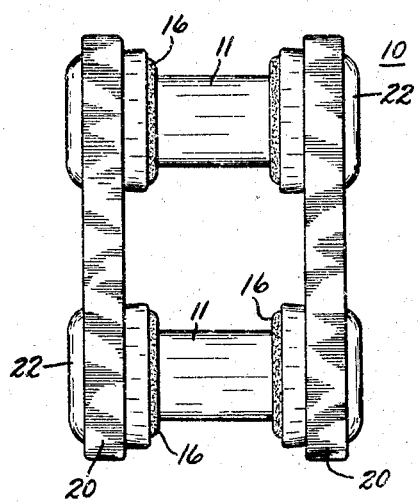
Fig. 3 is an elevation of the completely assembled extension shackle unit ready to be attached to the parts connected thereby.

Numeral 10 marks the extension shackle unit in its entirety as shown in Fig. 3. This unit comprises two transverse tubes 11, each having two separately molded resilient rubber blocks 12 inserted snugly therein from the opposite ends thereof. Each rubber block 12 has an enlarged head portion 13 which extends around on the outside of and encases the end portions 14 of tubes 11. In other words the enlarged ends of blocks 12 are molded with annular recesses therein into which the end portions 14 of tubes 11 slip when rubber blocks 12 are inserted into tubes 11. In their original molded or non-distorted form the overlapping portions 13 of blocks 12 preferably terminate approximately at the dotted lines 15 (see upper bushing of Fig. 2) and the blocks 12 are slightly longer than as shown in Fig. 2 to provide for the volume of resilient rubber necessary when the rubber is distorted to complete the filling of the annular space between the dotted lines 15 and the unconfined end bulges 16 of the portions 13.

Two side links 20 are preferably made from a stamped metal bar having large tapered apertures 21 at each end thereof and two separately formed pressed metal cups 22 inserted within the apertures 21 and rigidly fixed therein by any suitable means. In Fig. 8 the apertures 21 are shown with small transverse serrations 23 and the outer surface of cups 22 are provided with corresponding serrations 24 to provide a keying grip between the cups 22 and link 20 when these parts are assembled together with a tight fit. Preferably after cups 22 are pressed tightly within holes 21 they are spot welded or staked in place to avoid any possibility of loosening after a long period of use. The side links 20 with cups 22 rigidly fixed therein are next assembled upon the tubes 11 and rubber bushings 12 therein so that the enlarged end portions 13 fit snugly within cups 22. The two central rivets 25 are then passed through the cups 22 and bushings 12 and then the two side links 20 are forced toward each other by any suitable press until the resilient rubber is put under the desired initial compression. This forcing together of side links 20 compresses the entire mass of resilient rubber and causes the rubber in portions 13 to flow axially from the line 15 (which designates its normal non-distorted form) to the edges of cups 22 and causes it to bulge outwardly at the unconfined annular areas 16. The rivets 25 are then headed up while the side links 20 are thus held forced together, so that the parts will be permanently assembled together as a unit with the rubber under the desired initial compression. This unit 10 is shown in elevation in Fig. 3, ready for its attachment to the end of the leaf spring and chassis frame.

Figure 1:
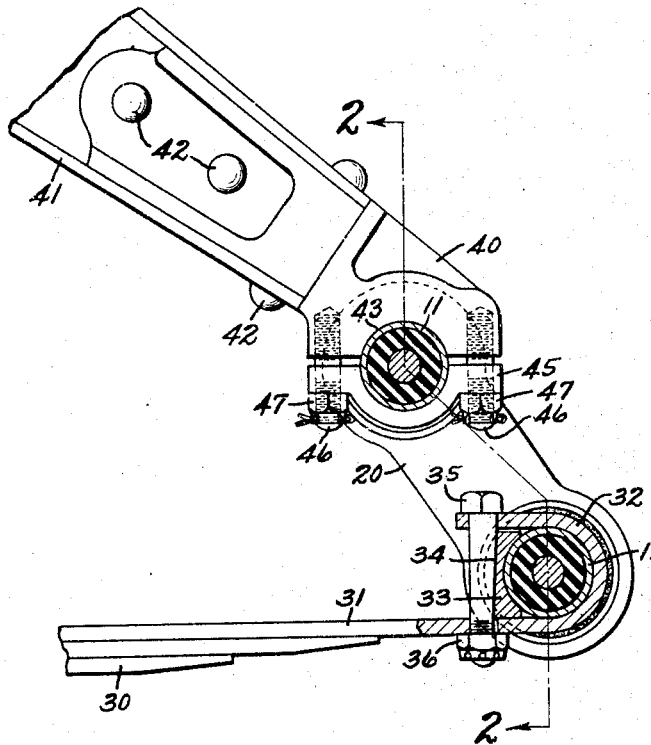
Fig. 1 is a view on line 1—1 of Fig. 2 and shows an extension shackle made according to this invention connecting the rear end of the rear spring of an automobile to the end of the chassis frame.

Numeral 30 marks the automobile rear semi-elliptic spring, the long leaf 31 having the U-bend 32 rolled therein so that the central portion of tube 11 will seat snugly therein. The assembled shackle unit 10 is then manipulated to slide the central portion of tube 11 through the open end of U-bend 32 and seat it against the U-bend as shown in Fig. 1. The clamping block 33 is inserted against the tube 11 and the tapered bolt 35 passed through aligned holes in the U-bend and in contact with the inclined surface 34 of clamping block 33. Now when nut 36 is drawn up tight the two portions of U-bend 32 will be drawn slightly together upon tube 11 and at the same time the clamping block 33 will be cammed tightly against one side of tube 11 by the tapered bolt 35. Both of these actions aid in rigidly fixing the central portion of tube 11 to the end of the spring leaf 31. The central portion of the upper tube 11 may be clamped by means of a divided clamp rigid with the bracket 40 which in turn is rigidly fixed to the chassis side rail 41 by rivets 42. Bracket 40 has a cylindrical seat 43 upon which tube 11 is seated after which the cap 45 is set in place and clamped tight upon tube 11 by the two bolts 46 and nuts 47.

In operation, the upper and lower tubes 11 will be held rigid with the bracket 40 and the outer end of spring leaf 31 respectively, and hence all swinging movement of the shackle links 20 will be permitted by an internal twist within the resilient rubber bushings since the resilient rubber is forced into a non-slipping grip upon its confining metal parts by the high compression under which it is held constantly. It will be obvious that the bearing area upon the rubber is greatly increased by having the metal cups 22 overlapping the end portions of tubes 11 with the rubber portions 13 therebetween. In other words the total bearing area of the tube 11 upon the resilient rubber is the projected area of the entire length of the tube 11 plus the projected area of the two end portions 14 thereof which are encased in rubber on their exterior surfaces. Such increased bearing area permits a more resilient rubber material to be used and hence provides an easier pivoting of the shackle.

The extension shackle shown in Figs. 4 and 5 is similar to that above described and similar reference numerals designate similar parts. In this form of the invention the upper tube 11' is fixed by means of a pressed fit within eye 50 of bracket 40, and the lower tube 11' is similarly fixed within an eye 51 rolled in the end of leaf 31. The rubber bushings 12' are then inserted in place and the separate metal cups 22' telescoped upon the enlarged heads 13', after which the bolts 25' are inserted and the metal cups 22' forced toward each other until the nuts 26 can be started upon bolts 25'. The final adjustment of the initial compression upon the resilient rubber is obtained by turning nuts 26, which are then locked in position by pins 27.

After these parts are fully assembled in this manner the spring 30 and chassis rail 41 are brought to their correct relative positions and the two side links 20' slipped into place over the metal cups 22' and the cross bolt 60 applied to retain the side links 20' clamped rigidly to the cups 22' and to each other.

The operation of this shackle will be obvious from the description hereinabove in connection with the form shown in Figs. 1 and 2. In the form shown in Figs. 4 and 5 there is a narrow annular restriction "A" between the ends of tubes 11' and the bottoms of cups 22' (see Fig. 5). These restrictions "A" permit a somewhat higher compression of the rubber within tubes 11' without excessive outward bulging of the rubber portions 13' at their unconfined annular end surfaces, since the restrictions "A" aid in resisting the flow of resilient rubber when it is compressed by the clamping together of the cups 22'.

Figs. 6 and 7 illustrate a pivot shackle connecting the front end of the front spring of an auto to the front end of the chassis side rail 70. In this form the shackle unit comprising the tube 11, rubber bushings 12, end cups 22 and bolt 25' is first completely assembled and fixed to the depending flanges 71 of the side rail 70, these flanges 71 therefore corresponding to the side links 20' in Fig. 5. The cups 22 may have their outer periphery corrugated or fluted or pressed to a non-circular section and fitting with a tight fit within correspondingly shaped holes in flanges 71 to prevent the rotation of cups 22. After this pivot unit is fixed to flanges 71, the spring leaf 31 is manipulated to hook its U-bend 32 around the central portion of tube 11, after which the U-bend 32 is rigidly fixed to the tube 11. This may be done either by the method clearly shown in Fig. 2 or by the modified method shown in Fig. 6. In Fig. 6, the clamping block 75 is of slightly less depth than the distance between the sides of U-bend 32 and has a cylindrical seat 76 which fits snugly against tube 11. Hence when screw 77 is applied and screwed up tight the lower part of seat 76 will engage partially under tube 11 and thus provide a reaction for screw 77 to clamp the top side of U-bend 32 down upon tube 11. By this means tube 11 is rigidly clamped to the spring end without the necessity of having an aperture through the spring leaf for the lower end of bolt 77, which aperture would of course weaken the spring leaf to some extent. A hole 78 is provided in the web of side rail 70 through which an end wrench may be inserted upon the head of bolt 77 for turning same. If desired, the pivot shackle unit may be first assembled upon an eye rolled in the end of the spring leaf as above described in connection with Figs. 4 and 5, and thereafter the two cups 22 suitably fixed to the side rail 70 by suitable means such as a divided clamping bracket similar to that shown in Fig. 1 for clamping the tube 11 rigid with the side rail 41.

While the form of embodiment of the present invention as herein disclosed, constitutes a preferred form, it is to be understood that other forms might be adopted, all coming within the scope of the claims which follow.

What is claimed is as follows:

1. An extension shackle unit capable of being attached in assembled form to connect two relatively movable parts, comprising: two transverse metal sleeves, resilient rubber bushings within said sleeves having enlarged heads projecting beyond and encasing the two end portions of said sleeves respectively, two side links having end recesses encasing and confining said enlarged heads, pins extending through each of said rubber bushings and engaging said side links, and means for clamping said side links laterally toward each other to highly compress said resilient bushings and cause axial elongation of said enlarged heads thereof, the central portions of said metal sleeves being left unobstructed to permit attachment thereto of said two relatively movable parts respectively.

2. An extension shackle unit capable of being attached in assembled form to connect two relatively movable parts, comprising: two transverse metal sleeves, resilient rubber bushings within said sleeves having enlarged heads, said heads having grooves of substantial depth therein into which the two end portions of said sleeves project respectively, two side links having end recesses encasing and confining said enlarged heads, pins extending through each of said rubber bushings and side links and retaining said side links forced inwardly toward each other to highly compress said resilient bushings, the central portion of said transverse sleeves being left unobstructed to permit attachment thereto of the relatively movable parts connected by said shackle unit.

3. An extension shackle unit capable of being attached in assembled form to connect two relatively movable parts, comprising: two transverse metal sleeves, resilient rubber bushings within said sleeves having enlarged heads, said heads having grooves of substantial depth therein into which the two end portions of said sleeves project respectively, two side links having end recesses encasing and confining said enlarged heads, pins extending through each of said rubber bushings and side links and clamping said side links forced inwardly upon and highly compressing said bushings and enlarged heads thereon.

4. An extension shackle unit capable of being attached in assembled form to connect two relatively movable parts, comprising: two transverse metal sleeves, resilient rubber bushings within said sleeves having enlarged heads projecting beyond and encasing the two end portions of said sleeves respectively, metal end cups telescoped upon and confining each of said enlarged heads, central pins extending through said bushings and end cups and retaining said cups clamped laterally upon said enlarged heads to compress and axially elongate same, and two side links each rigidly fixed to the two cups on its side to form a completely assembled shackle unit.

5. An extension shackle unit capable of being attached in assembled form to connect two relatively movable parts, comprising: two transverse metal sleeves, resilient rubber bushings within said sleeves having enlarged heads projecting beyond and encasing the two end portions of said sleeves respectively, metal end cups telescoped upon and confining each of said enlarged heads, central pins extending through said bushings and end cups and retaining said cups clamped laterally upon said enlarged heads to compress and axially elongate same, and two side links each having recessed end portions receiving the two cups on its side and rigidly fixed thereto to form an integral shackle unit prior to its assembling upon the connected parts.

6. A pivot connection between two relatively movable parts comprising: a metal sleeve having its central portion rigidly fixed to one of said parts, a resilient rubber bushing within said sleeve having enlarged heads projecting beyond and encasing the two end portions of said sleeve, two metal end cups telescoped upon and confining said heads, a central pin extending through said bushing and end cups and retaining said cups clamped upon said enlarged heads to highly compress said resilient bushing, said two cups having their outer peripheries telescoped upon and fixed to the other of said connected parts.

7. A pivot connection between two relatively movable parts comprising: a metal sleeve having its central portion rigidly fixed to one of said parts, a resilient rubber bushing within said sleeve having enlarged heads projecting beyond and encasing the two end portions of said sleeve, two metal end cups telescoped upon and confining said heads, a central pin extending through said bushing and end cups and retaining said cups clamped upon said enlarged heads to highly compress said resilient bushing, said two cups being telescoped within apertures in the other of said connected parts and rigidly fixed in said apertures.

8. A pivot shackle unit capable of being attached in assembled form to two connected parts, comprising: a metal sleeve, a resilient rubber bushing within said sleeve having enlarged heads, said heads having grooves of substantial depth into which the end portions of said sleeve project, two end cups confining said heads, and a central pin extending through said bushing and fixed to said end cups, the central portion of said transverse sleeve remaining unobstructed to permit attachment thereto of one of said connected parts.

9. In combination, a leaf spring having a U-bend formed in the end of the long leaf thereof, the two sides of the U-bend being substantially parallel, an assembled double-pivot swinging shackle unit for said leaf spring having a transverse member movable in a direction longitudinally of said leaf spring to seat snugly within the bottom of said U-bend, and means for rigidly fixing said transverse member in the bottom of said U-bend after it has been so moved into place therein.

10. In combination, a leaf spring having a U-bend formed in the end of the long leaf thereof, the two sides of the U-bend being substantially parallel, an assembled double-pivot swinging shackle unit for said leaf spring having a transverse member attached thereto, said transverse member having substantially the same height dimension as the distance between the sides of said U-bend whereby said transverse member may be moved longitudinally of said spring to seat in the bottom of said U-bend, and means for fixing said transverse member in place in the bottom of said U-bend.

11. In combination, a leaf spring having a U-bend formed in the end of the long leaf thereof, an assembled double-pivot swinging shackle unit for said leaf spring having a transverse member attached thereto, said transverse member having such a height dimension that it may be moved longitudinally of said spring through the open end of said U-bend and into its final place in the bottom of said U-bend, and means for holding said transverse member in the bottom of said U-bend after it has been so moved into place therein.

RALPH H. CHILTON.